US 8,147,578 B2

(12) United States Patent
Bannister et al.

(10) Patent No.: US 8,147,578 B2
(45) Date of Patent: Apr. 3, 2012

(54) REDUCED RESTRICTION AIR FILTER

(75) Inventors: Robert A. Bannister, Stoughton, WI (US); Kaarthik Venkataraman, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 225 days.

(21) Appl. No.: 12/724,474

(22) Filed: Mar. 16, 2010

(65) Prior Publication Data

US 2010/0263338 A1    Oct. 21, 2010

Related U.S. Application Data

(60) Provisional application No. 61/169,448, filed on Apr. 15, 2009.

(51) Int. Cl.
*B01D 46/10* (2006.01)

(52) U.S. Cl. ............. 55/385.3; 55/498; 55/510; 55/529; 123/198 E

(58) Field of Classification Search ................. 55/385.3, 55/385.1, 462, 309, 418, 497, 502, 318, DIG. 28; 123/198 E; 180/219, 225, 226
See application file for complete search history.

(56) References Cited

U.S. PATENT DOCUMENTS

| 4,393,652 | A | * | 7/1983 | Munro | ............................ 60/295 |
| 5,472,463 | A | * | 12/1995 | Herman et al. | ................. 55/319 |
| 5,655,497 | A | * | 8/1997 | Nakajima | ................ 123/198 E |
| 5,902,364 | A | * | 5/1999 | Tokar et al. | ...................... 55/498 |
| 6,251,151 | B1 | * | 6/2001 | Kobayashi et al. | ............ 55/309 |
| 6,293,981 | B1 | * | 9/2001 | Holderle et al. | ................ 55/318 |
| 6,840,973 | B2 | * | 1/2005 | Kuji et al. | .................... 55/385.3 |
| 7,393,372 | B2 | * | 7/2008 | Cassell et al. | .................. 55/310 |
| 7,717,974 | B2 | * | 5/2010 | Diepolder et al. | ........... 55/385.3 |
| 2003/0105101 | A1 | * | 6/2003 | Black | ............................ 514/247 |
| 2009/0241868 | A1 | * | 10/2009 | Morita et al. | ................ 123/54.4 |
| 2011/0239600 | A1 | * | 10/2011 | Smith et al. | .................. 55/385.3 |

* cited by examiner

*Primary Examiner* — Duane Smith
*Assistant Examiner* — Minh-Chau Pham
(74) *Attorney, Agent, or Firm* — Andrus, Sceales, Starke & Sawall, LLP

(57) ABSTRACT

A filter assembly and filter element are provided utilizing a given volume of space effectively and efficiently with low restriction. An irregular shape filter is provided to fit the space, including a filter element circumscribing an inner plenum and having an axially extending sidewall. The sidewall has a differential axial height as it circumscribes the inner plenum.

12 Claims, 6 Drawing Sheets

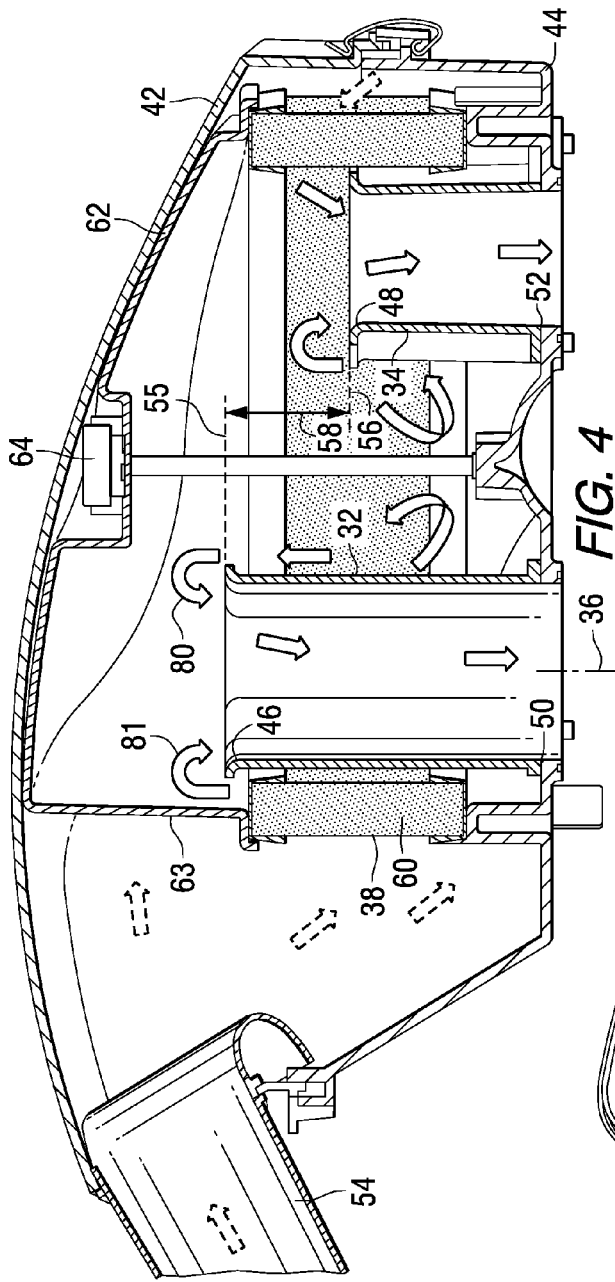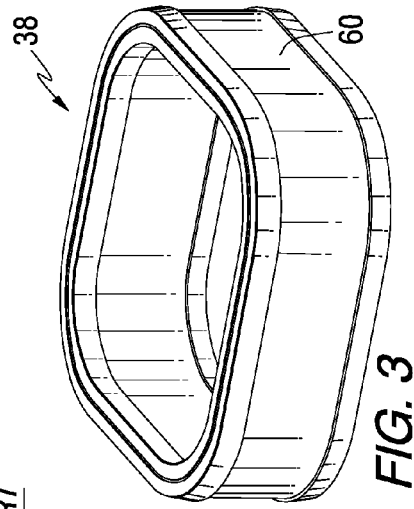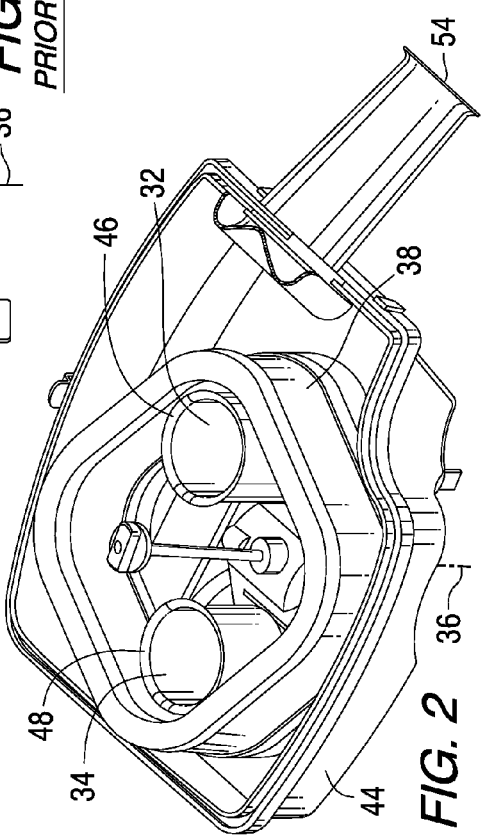

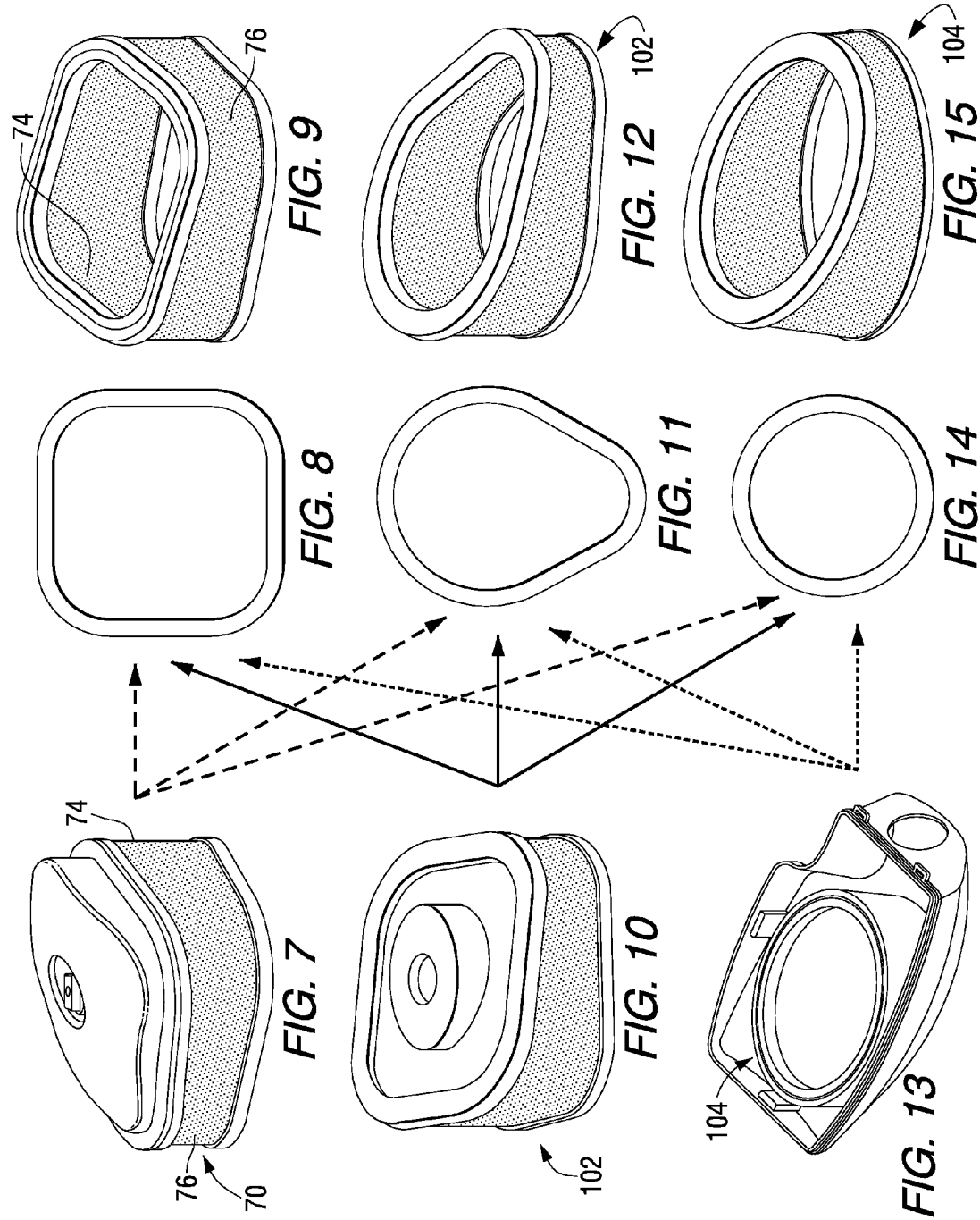

REDUCED RESTRICTION AIR FILTER

CROSS-REFERENCE TO RELATED APPLICATION

This application claims the benefit of and priority from provisional U.S. Patent Application No. 61/169,448, filed Apr. 15, 2009, incorporated herein by reference.

BACKGROUND AND SUMMARY

The invention relates to air filters, including efficient utilization of space provided, including around velocity stacks.

Air filters are known in the prior art. The present invention arose during continuing development efforts directed toward efficient and effective utilization of space as may be provided in a given implementation which may have spatial constraints and limited spatial volume available.

In one embodiment, responsive to a given available space in a velocity stack air filter assembly in a motorcycle, an effective and efficient filtering system is provided. A velocity stack air filter assembly includes first and second axially extending velocity stacks, e.g. for tuning, resonance, or the like, in an air induction system for an internal combustion engine. The axially extending velocity stacks are laterally spaced from each other. A filter element circumscribes and is spaced laterally outwardly of the velocity stacks. A housing is provided around the filter element and the velocity stacks. Each velocity stack has inlet axial end and an outlet axial end. The housing has an inlet, such that dirty air enters the housing through the housing inlet and then flows laterally through the filter element and is filtered thereby, and clean filtered air then flows into the inlet axial ends of the velocity stacks and flows axially through the velocity stacks and exits out of the outlet axial ends of the velocity stacks as combustion air to the engine. The inlet axial ends of the velocity stacks lie in respective first and second lateral planes which are axially spaced from each other.

The present invention arose during continuing development efforts directed toward filters, including air filters, including velocity stack air filters. In a desirable embodiment, the present filter provides reduced restriction and increased filter element area.

BRIEF DESCRIPTION OF THE DRAWINGS

FIG. 2 is like FIG. 1 and shows a view with the filter cover removed.

FIG. 3 is a perspective view of the filter element of FIGS. 1 and 2.

FIG. 4 is a sectional view showing the assembly of FIGS. 1 and 2.

FIG. 7 is a perspective view of a filter element in accordance with invention.

FIG. 8 is a top plan view of a component of FIG. 7.

FIG. 9 is a perspective view of the filter element of FIG. 7 with the cover removed.

FIG. 10 is like FIG. 7 and shows another embodiment.

FIG. 11 is like FIG. 8 and shows a further embodiment.

FIG. 12 is like FIG. 9 and shows a further embodiment.

FIG. 13 is like FIG. 10 and shows a further embodiment.

FIG. 14 is like FIG. 11 and shows a further embodiment.

FIG. 15 is like FIG. 12 and shows a further embodiment.

DETAILED DESCRIPTION

Figure 1:
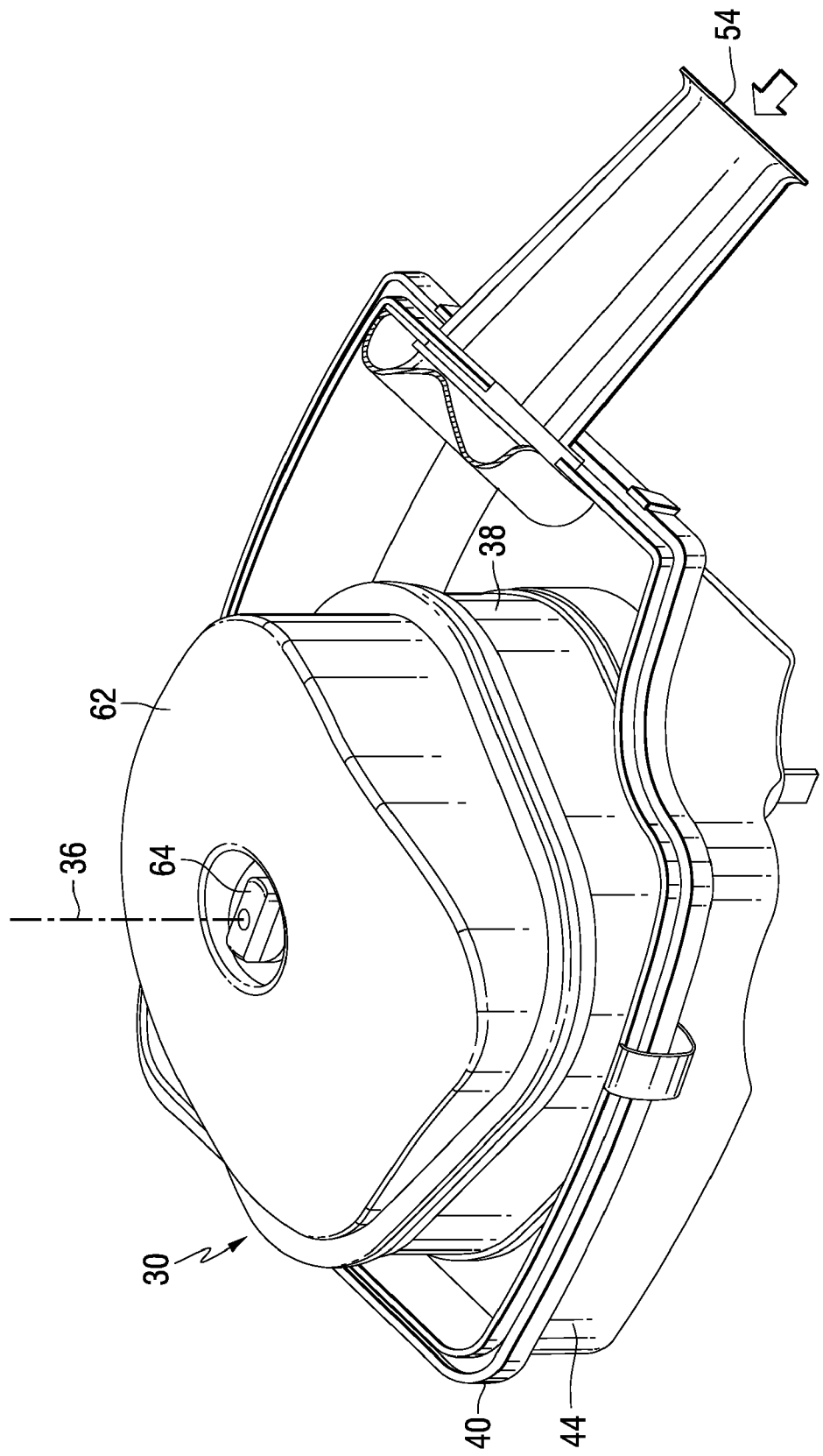
FIG. 1 is a perspective view partially cut away of an air filter assembly known in the prior art.

FIGS. 1-4 show an air filter assembly 30 known in the prior art. First and second axially extending velocity stacks 32 and 34, FIGS. 2, 4, extend axially along axis 36 and are laterally spaced from each other. A filter element 38 circumscribes and is spaced laterally outwardly of the velocity stacks. A housing or air box 40, including upper and lower mating housing members 42 and 44, is provided around the filter element and the velocity stacks. Velocity stacks 32 and 34 have respective inlet axial ends 46 and 48, and outlet axial ends 50 and 52. Housing 40 has an inlet 54, such that dirty air enters the housing through housing inlet 54 and then flows laterally through filter element 38 and is filtered thereby and clean filtered air then flows into inlet axial ends 46, 48 of velocity stacks 32, 34 and flows axially (downwardly in FIG. 4) through the velocity stacks and exits out of outlet axial ends 50, 52 of the velocity stacks, for example to flow into the air induction system of an internal combustion engine. Inlet axial end 46 of first velocity stack 32 lies in a first lateral plane (a plane extending into the page in FIG. 4). This first lateral plane is shown in dashed line at 55. Inlet axial end 48 of second velocity stack 34 lies in a second lateral plane, as shown in dashed line at 56. The first and second lateral planes 55 and 56 are axially spaced from each as shown at axial dimension 58. The differing axial length and/or height of velocity stacks 32 and 34 may be desirable for tuning, resonance, or the like, as known in the prior art. Filter element 38 has an axially extending sidewall 60 circumscribing the velocity stacks and through which dirty air flows laterally inwardly towards the velocity stacks as clean filtered air. The filter element may be covered by a filter cover 62 secured by wing nut 64.

Figure 5:
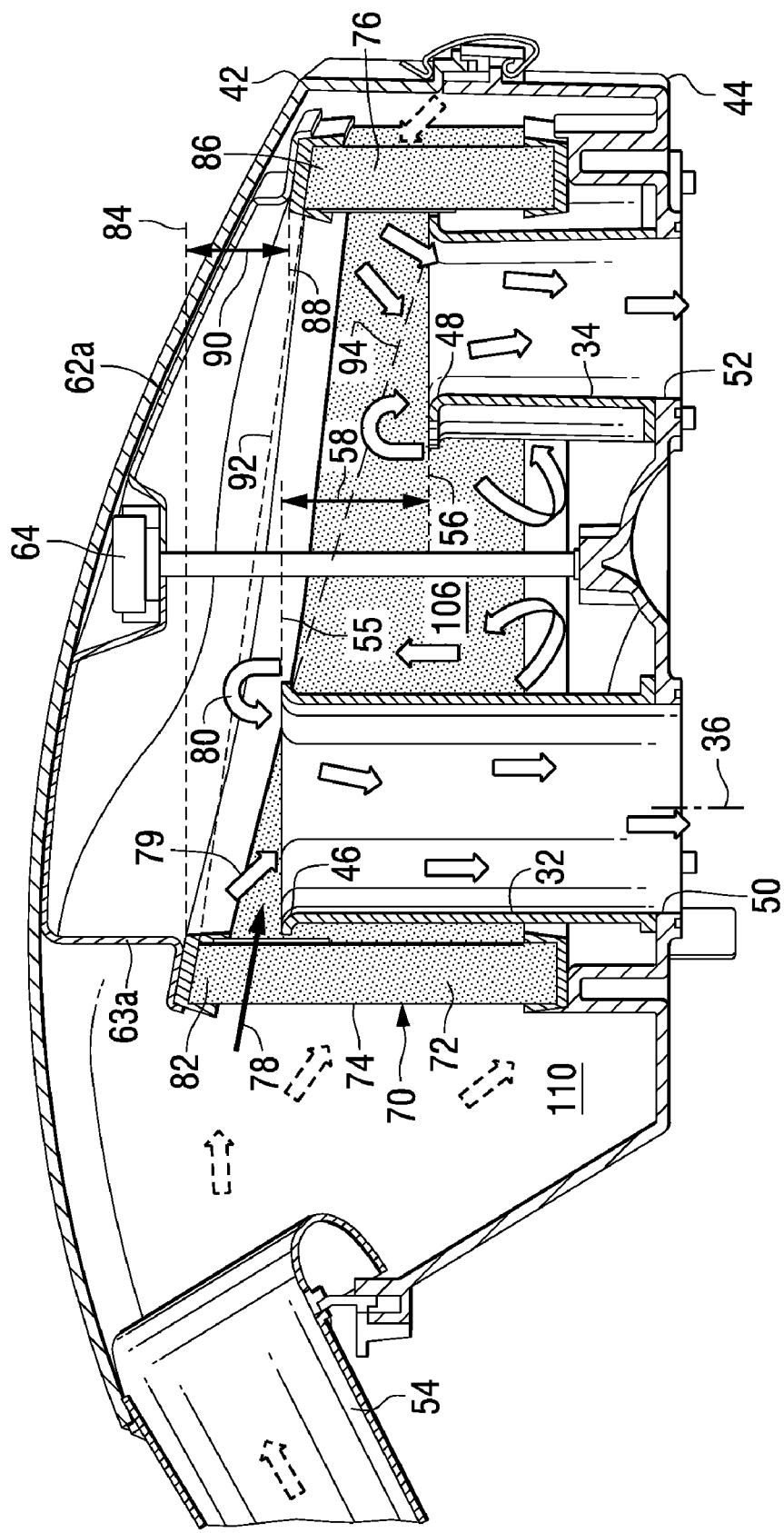
FIG. 5 is a sectional view showing a filter assembly in accordance with the present invention.
Figure 6:
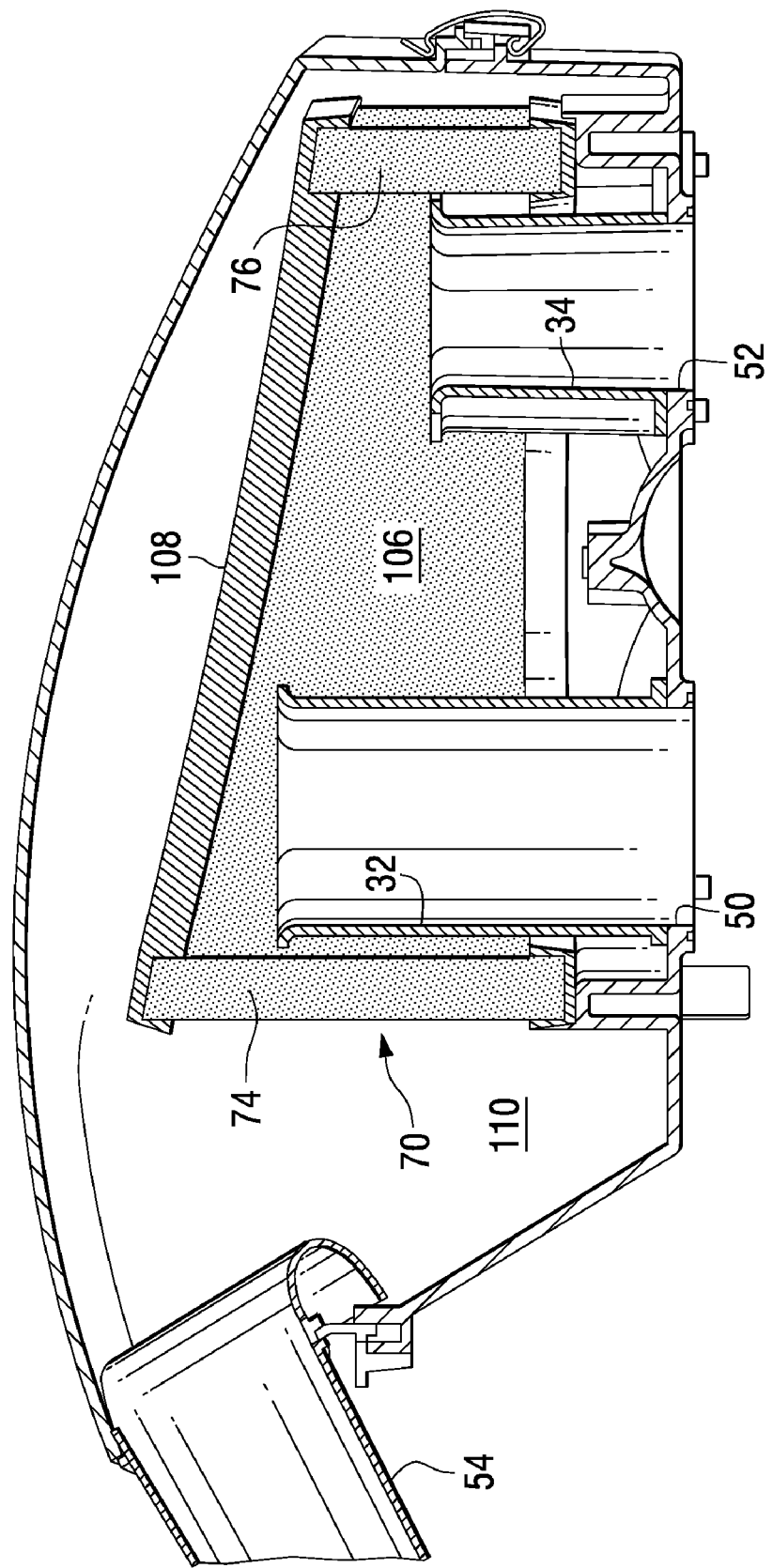
FIG. 6 is like FIG. 5 and shows a further embodiment.
Figure 16:
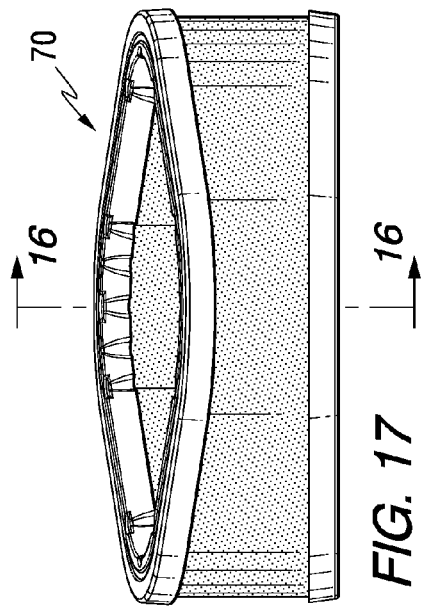
FIG. 16 is a sectional view of a filter element in accordance with the invention.
Figure 17:
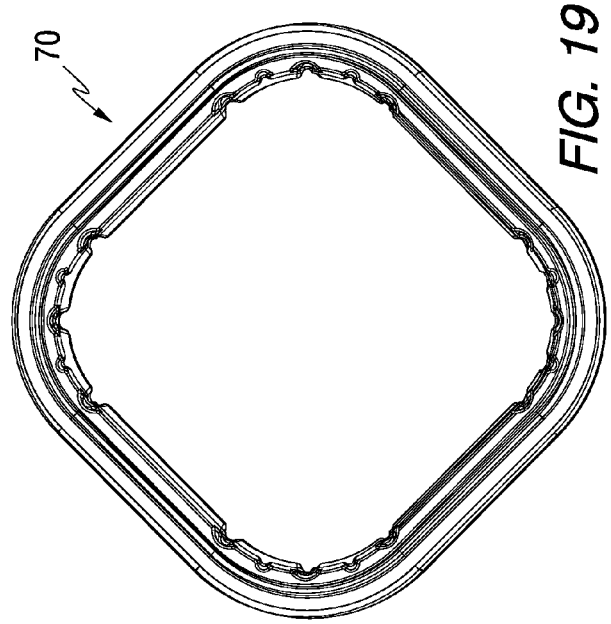
FIG. 17 is a side plan view of the filter element of FIG. 16.
Figure 18:
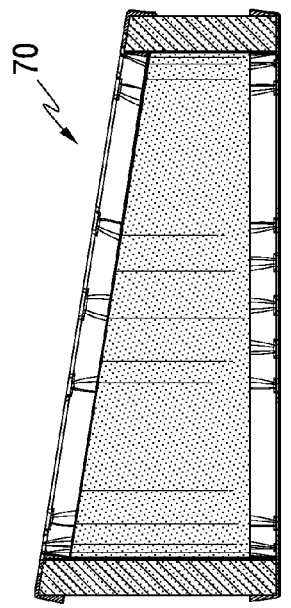
FIG. 18 is a perspective view of the filter element of FIGS. 16, 17.
Figure 19:
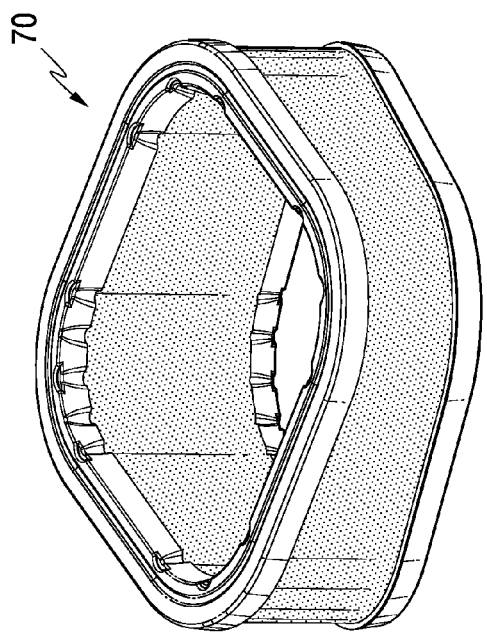
FIG. 19 is a top plan view of the filter element of FIGS. 16-18.

FIGS. 5-19 illustrate the present invention and use like reference numerals from above where appropriate to facilitate understanding. Filter element 38 of FIGS. 1-4 is replaced by filter element 70 having a sidewall 72 with a differential axial length as it circumscribes velocity stacks 32, 34. Sidewall 72 has a first section 74, FIGS. 5-9, of a first axial length adjacent first velocity stack 32. Sidewall 72 has a second section 76 of a second axial length adjacent second velocity stack 34. The noted first axial length is greater than the noted second axial length. This differential axial length provides greater filter element media and surface area. This differential axial length also reduces restriction by enabling a direct flow component of incoming air flow as shown at arrows 78, 79 in contrast to FIG. 4 where all of the incoming air flow to velocity stack 32 must make a turn as shown at arrows 80, 81. In FIG. 5, some of the incoming air flow may take a more direct and less tortuous flow path as shown at arrows 78, 79. In contrast, in FIG. 4 all of the incoming air flow to velocity stack 32 must make a sharp turn, e.g. as shown at arrows 81, 80. In FIG. 5, some of the incoming air makes a sharp turn as shown at arrow 80 from the lower part of the filter element, however some other portions of the incoming air takes a more direct and less tortuous path as shown at arrows 78, 79, coming from the upper portion of the filter element. This is illustrated in comparing FIGS. 5 and 4, particularly arrows 79 and 81, respectively.

First section 74 of sidewall 72 has an axial end 82 lying in a third lateral plane 84. Second section 76 of sidewall 72 has an axial end 86 lying in a fourth lateral plane 88. The third and fourth lateral planes 84 and 88 are axially spaced from each other as shown at axial dimension 90. Axial ends 82 and 86 of respective first and second sections 74 and 76 of sidewall 72 lie along a first oblique projection line 92 extending obliquely relative to each of the noted third and fourth lateral planes 84 and 88. Inlet axial ends 46 and 48 of the respective first and second velocity stacks 32 and 34 lie along a second oblique projection line 94 extending obliquely relative to each of the noted first and second lateral planes 54 and 56. In one embodiment, first and second oblique projection lines 92 and 94 are nonparallel to each other, though in other embodiments such lines may be parallel to each other. The noted third lateral plane 84 is axially spaced from the noted first lateral plane 55 along a first axial direction (upwardly in FIG. 5). The noted fourth lateral plane 88 is axially spaced from the noted second lateral plane 56 in the same noted first axial direction (upwardly in FIG. 5). In one embodiment, the first and fourth lateral planes 55 and 88 are coplanar, and in other embodiments they are not coplanar. Filter cover 62 in FIGS. 1, 4 has a sidewall 63 facing inlet 54. In FIG. 5, the filter cover is modified as shown at 62a and has a reduced height sidewall 63a facing inlet 54. The filter element may have other shapes as shown at filter element 102 in FIGS. 10-12, and filter element 104 in FIGS. 13-15. FIGS. 16-19 show further views of filter element 70.

The filter of FIGS. 5-19 in one desirable embodiment is used in a velocity stack implementation as shown. Other embodiments and implementations are possible for various filter applications, including air filter applications which may or may not have velocity stacks, and which may be automotive or non-automotive. The system utilizes the volume and space available in the particular implementation, e.g. in a limited space underhood automotive application, for example in one embodiment by providing an irregular shape filter to fit in such space. The filter includes a housing 40, and a filter element 70 in the housing, the filter element having an axially extending sidewall 72 circumscribing an inner plenum 106 radially inwardly thereof, FIGS. 5, 6. Filter element 70 may be covered by filter cover 62a, FIG. 5, or the filter element may have an end cap 108, FIG. 6, spanning the hollow interior or plenum 106 in place of filter cover 62a. In a further embodiment, there is no separate cover such as 62a, FIG. 5, nor a filter end cap such as 108, FIG. 6, covering inner plenum 106, but rather the filter end cap seal is made directly to housing member 42, e.g. FIGS. 13-15, which creates a new and larger inner plenum volume at 106. The housing circumscribes filter element 70 and defines an outer plenum 110 between the housing and filter element 70, radially outwardly Of the filter element. The housing has the noted inlet 54 to one of the plenums, e.g. outer plenum 110, and an outlet, e.g. 50 and/or 52, from the other of the plenums, e.g. 106. This provides outside-in flow through the filter element. The flow path may be reversed to provide inside-out flow, with port 50 and/or 52 providing the inlet, and port 54 providing the outlet. For the noted outside-in flow, dirty fluid enters inlet 54 and then flows radially through axially extending sidewall 72 of filter element 70 and then exits outlet 50 and/or 52. Sidewall 72 has a differential axial length as it circumscribes inner plenum 106.

Sidewall 72 of filter element 70 has the noted first section 74 of a first axial length, and the noted second section 76 of a second axial length. The noted first axial length is greater than the noted second axial length. In the embodiment shown, first and second sections 74 and 76 of sidewall 72 are distally opposite each other across inner plenum 106. First section 74 of sidewall 72 has the noted axial end 82 facing in a first axial direction, e.g. upwardly in FIGS. 5, 6, and lying in a first lateral plane 84. Second section 76 of sidewall 72 has the noted axial end 86 facing in the noted first axial direction, namely upwardly in FIGS. 5, 6, and lying in a second lateral plane 88. The first and second lateral planes 84 and 88 are offset from each other by being axially spaced from each other, as shown at axial spacing dimension 90. Axial ends 82 and 86 of first and second sections 74 and 76 of sidewall 72 lie along an oblique projection line 92 extending obliquely relative to each of the noted first and second lateral planes 84 and 88. In the embodiment shown, the filter is an air filter, and the filter element is an air filter element, though other embodiments and implementations are possible for other fluid filter applications. In further embodiments, the filter, filter assembly, and/or filter element may be used with or without the noted velocity stacks 32, 34. In the velocity stack embodiment, sidewall 72 of filter element 70 circumscribes velocity stacks 32, 34 and inner plenum 106. Sidewall 72 has a differential axial length as it circumscribes the velocity stacks 32, 34 and the hollow interior plenum 106. Dirty air enters the housing through housing inlet 54 into outer plenum 110 and then flows laterally through filter element 70 and is filtered thereby and clean filtered air then flows into inlet axial ends 46, 48 of velocity stacks 32, 34 and flows axially through the velocity stacks and exits out of the outlet axial ends 50, 52 of the velocity stacks. The inlet axial end 46 of first velocity stack 32 lies in a first lateral plane 55, and the inlet axial end 48 of the second velocity stack 34 lies in a second lateral plane 56. Lateral planes 55 and 56 are offset from each other by being axially spaced from each other, as shown at axial spacing dimension 58. Filter element 70 has the noted axially extending sidewall 72 circumscribing velocity stacks 32, 34 and through which dirty air flows laterally inwardly and exits as clean filtered air. Sidewall 72 has the noted first section 74 adjacent first velocity stack 32. First section 74 of sidewall 72 has the noted axial end 82 lying in lateral plane 84. Sidewall 72 has the noted second section 76 adjacent second velocity stack 34. Second section 76 of sidewall 72 has the noted axial end 86 lying in lateral plane 88. Lateral planes 84 and 88 are offset from each other by being axially spaced from each other, as shown at axial spacing dimension 90. Axial ends 82 and 86 of first and second sections 72 and 76, respectively of sidewall 72 lie along an oblique projection line 92 extending obliquely relative to each of lateral planes 84 and 88. Axial ends 46 and 48 of velocity stacks 32 and 34 lie along a second oblique projection line 94 extending obliquely relative to lateral planes 55 and 56. Oblique projection lines 92 and 94 are nonparallel to each other. Lateral plane 84 is axially spaced from lateral plane 55 along a first axial direction, e.g. upwardly in FIGS. 5, 6. Lateral plane 88 is axially spaced from lateral plane 56 along the same noted first axial direction. The noted lateral planes 55, 56, 84 and 88 are all parallel to each other. In the embodiment shown, lateral plane 55 is coplanar with lateral plane 88.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter comprising a housing, a filter element in said housing, said filter element having an axially extending sidewall circumscribing an inner plenum radially inwardly thereof, said housing circumscribing said filter element and defining an outer plenum between said housing and said filter element, said housing having an inlet to one of said plenums, and an outlet from the other of said plenums, such that dirty fluid enters said inlet and then flows radially through said axially extending sidewall of said filter element and then exits said outlet, said sidewall having a differential axial length as it circumscribes said inner plenum, wherein said sidewall has a first section of a first axial length, and a second section of a second axial length, said first axial length being greater than said second axial length, wherein said first section of said sidewall has an axial end facing in a first axial direction and lying in a first lateral plane, said second section of said sidewall has an axial end facing in said first axial direction and lying in a second lateral plane, wherein said first and second lateral planes are offset from each other, and wherein said axial ends of said first and second sections of said sidewall lie along an oblique projection line extending obliquely relative to each of said first and second lateral planes.

2. A filter element for a filter assembly comprising a housing, said filter element being housed in said housing, said filter element having an axially extending sidewall circumscribing an inner plenum radially inwardly thereof, said housing circumscribing said filter element and defining an outer plenum between said housing and said filter element, said housing having an inlet to one of said plenums, and an outlet from the other of said plenums, such that dirty fluid enters said inlet and then flows radially through said axially extending sidewall of said filter element and then exits said outlet, said sidewall having a differential axial length as it circumscribes said inner plenum, wherein said sidewall has a first section of a first axial length, and a second section of a second axial length, said first axial length being greater than said second axial length, wherein said first section of said sidewall has an axial end facing in a first axial direction and lying in a first lateral plane, said second section of said sidewall has an axial end facing in said first axial direction and lying in a second lateral plane, wherein said first and second lateral planes are offset from each other, and wherein said axial ends of said first and second sections of said sidewall lie along an oblique projection line extending obliquely relative to each of said first and second lateral planes.

3. An air filter assembly comprising first and second axially extending velocity stacks, said velocity stacks being laterally spaced from each other, a filter element circumscribing and spaced laterally outwardly of said velocity stacks, a housing around said filter element and said velocity stacks, each said velocity stack having an inlet axial end and an outlet axial end, said housing having an inlet, such that dirty air enters said housing through said housing inlet and then flows laterally through said filter element and is filtered thereby and clean filtered air then flows into said inlet axial ends of said velocity stacks and flows axially through said velocity stacks and exits out of said outlet axial ends of said velocity stacks, said inlet axial end of said first velocity stack lying in a first lateral plane, said inlet axial end of second velocity stack lying in a second lateral plane, wherein said first and second lateral planes are offset from each other, said filter element having an axially extending sidewall circumscribing said velocity stacks and through which dirty air flows laterally inwardly and exits as clean filtered air, said sidewall having a first section adjacent said first velocity stack, said first section of said sidewall having an axial end lying in a third lateral plane, said sidewall having a second section adjacent said second velocity stack, said second section of said sidewall having an axial end lying in a fourth lateral plane, wherein said third and fourth lateral planes are offset from each other, wherein said axial ends of said first and second sections of said sidewall lie along an oblique projection line extending obliquely relative to each of said third and fourth lateral planes.

4. The air filter assembly according to claim 3 wherein said oblique projection line is a first oblique projection line, and wherein said inlet axial ends of said first and second velocity stacks lie along a second oblique projection line extending obliquely relative to each of said first and second lateral planes, wherein said first and second oblique projection lines are nonparallel to each other.

5. The air filter assembly according to claim 3 wherein said third lateral plane is axially spaced from said first lateral plane along a first axial direction, and said fourth lateral plane is axially spaced from said second lateral plane along said first axial direction.

6. The air filter assembly according to claim 3 wherein said first, second, third and fourth lateral planes are parallel to each other.

7. The air filter assembly according to claim 3 wherein said first and fourth lateral planes are coplanar.

8. An air filter element for an air filter assembly comprising first and second axially extending velocity stacks, said velocity stacks being laterally spaced from each other, said air filter element circumscribing and spaced laterally outwardly of said velocity stacks, a housing around said filter element and said velocity stacks, each said velocity stack having an inlet axial end and an outlet axial end, said housing having an inlet, such that dirty air enters said housing through said housing inlet and then flows laterally through said filter element and is filtered thereby and clean filtered air then flows into said inlet axial ends of said velocity stacks and flows axially through said velocity stacks and exits out of said outlet axial ends of said velocity stacks, said inlet axial end of said first velocity stack lying in a first lateral plane, said inlet axial end of second velocity stack lying in a second lateral plane, wherein said first and second lateral planes are offset from each other, said filter element having an axially extending sidewall circumscribing said velocity stacks and through which dirty air flows laterally inwardly and exits as clean filtered air, said sidewall having a first section adjacent said first velocity stack, said first section of said sidewall having an axial end lying in a third lateral plane, said sidewall having a second section adjacent said second velocity stack, said second section of said sidewall having an axial end lying in a fourth lateral plane, said third and fourth lateral planes are offset from each other, wherein said axial ends of said first and second sections of said sidewall lie along an oblique projection line extending obliquely relative to each of said third and fourth lateral planes.

9. The air filter element according to claim 8 wherein said oblique projection line is a first oblique projection line, and wherein said inlet axial ends of said first and second velocity stacks lie along a second oblique projection line extending obliquely relative to each of said first and second lateral planes, wherein said first and second oblique projection lines are nonparallel to each other.

10. The air filter element according to claim 8 wherein said third lateral plane is axially spaced from said first lateral plane along a first axial direction, and said fourth lateral plane is axially spaced from said second lateral plane along said first axial direction.

11. The air filter element according to claim 8 wherein said first, second, third and fourth lateral planes are parallel to each other.

12. The air filter element according to claim 8 wherein said first and fourth lateral planes are coplanar.

\* \* \* \* \*